United States Patent [19]
Öhlin et al.

[11] Patent Number: 6,039,159
[45] Date of Patent: Mar. 21, 2000

[54] SHOCK ABSORBER ARRANGEMENT AND USE

[75] Inventors: Kenth Öhlin, Sollentune; Magnus Danek, Huddigne, both of Sweden

[73] Assignees: Yamaha Hatsudoki Kabushiki Kaisha, Iwata, Japan; Öhlins Racing AB, Uppsland Vasby, Sweden

[21] Appl. No.: 08/988,662

[22] Filed: Dec. 11, 1997

[30] Foreign Application Priority Data

Dec. 11, 1996 [SE] Sweden .................................. 9604548

[51] Int. Cl.⁷ ...................................................... F16F 9/34
[52] U.S. Cl. ................................ 188/322.15; 188/322.22; 188/282.1
[58] Field of Search .......................... 188/322.15, 322.16, 188/322.17, 322.18, 322.22, 280, 281, 282.1; 267/64.15, 64.17

[56] References Cited

U.S. PATENT DOCUMENTS

| | | | |
|---|---|---|---|
| 3,836,132 | 9/1974 | McNally et al. | 267/64.17 |
| 5,115,892 | 5/1992 | Yamaoka et al. | 188/280 |
| 5,259,294 | 11/1993 | May | 188/322.15 |
| 5,697,477 | 12/1997 | Hiramoto et al. | 188/322.22 |

*Primary Examiner*—Mark T. Le
*Assistant Examiner*—Thomas J. Williams
*Attorney, Agent, or Firm*—Knobbe, Martens, Olson & Bear LLP

[57] ABSTRACT

A number of embodiments of hydraulic shock absorbers, including a damping arrangement that includes a cavity and an elastomeric member received in the cavity which cooperates with the fluid chamber so as to permit small degrees of relatively undamped fluid flow to improve road holding.

31 Claims, 6 Drawing Sheets

SHOCK ABSORBER ARRANGEMENT AND USE

BACKGROUND OF THE INVENTION

This invention relates to an improved shock absorber arrangement and use therefor.

It is well known to employ various types of hydraulic dampers in connection with suspension systems, especially those associated with vehicles and particularly road vehicles. The shock absorber performs the function of dampening the cushioned movement of the wheel relative to the vehicle body and cooperates with the spring and linkage system to achieve this effect. Generally, hydraulic shock absorbers are employed and various damping arrangements are incorporated with them. Basically, the shock absorber damps the movement by passing fluid through an orifice. The degree of restriction may be either constant if a fixed orifice is used or variable if a variable orifice and/or pressure responsive valving arrangement is employed.

Although these systems have been found to be quite effective, they nevertheless do present some problems because of their very nature. For example, it has been found that handling can be significantly improved if very small relative movements of the wheel relative to the frame are positioned in a generally undamped fashion. That is, a small amount of movement of the wheel relative to the vehicle body can be desirable even when that movement is undamped.

In accordance with an important feature of this invention, therefore, it is an object of the invention to provide a hydraulic damping arrangement wherein relatively small degrees of suspension movement may be accommodated without significant damping forces.

It is a further object of this invention to provide an improved damping arrangement for a hydraulic shock absorber wherein small amounts of fluid displacement are permitted without significant restrictions so as to achieve the aforenoted effects.

In accordance with the invention, this degree of relatively undamped movement can be accommodated by providing a chamber in which an elastic member is positioned. The chamber is exposed to the pressure chambers of the shock absorber on opposite sides of the elastic member. Thus, small movements can be accomplished by pressurizing the chamber and having the elastic member shift from one position to another without actually causing fluid flow to occur between the chambers. This shifting movement is relatively undamped.

Of course, there may be some displacement of fluid due to compression of the elastic member, and this elastic compression can give some degree of damping, although relatively slight in relation to the overall system. Nevertheless, this permits the shock absorber to be tuned to provide very good response under all conditions.

It is, therefore, a still further object of this invention to provide an improved damping arrangement and fluid flow system of this type utilizing an elastic member that is interposed between a pair of hydraulic chambers of the damper.

In order to permit the desired degree of relatively undamped movement, some displacement of fluid is required. In order to permit the necessary displacement of fluid and in accordance with a further feature of the invention, the elastic member comprises an elastic ring that is received in an annular cavity. Obviously, this cavity must be in sealing relationship between the sides of the ring so as to preclude significant flow of fluid past the ring, while still permitting the ring to move within the chamber. Obviously, this presents certain problems with the installation and assembly.

It is, therefore, a still further object of this invention to provide an improved fluid damping arrangement that is comprised of a cylindrical cavity in which an elastic ring is received.

SUMMARY OF THE INVENTION

A first feature of the invention is adapted to be embodied in a hydraulic damping arrangement for damping the relative movement of two components. The damping arrangement comprises a device that defines two fluid chambers between which controlled fluid flow is permitted for damping the relative movement. The damping arrangement further comprises a recess that communicates with each of the chambers and in which a slidable elastic element is provided. The elastic element is capable of being displaced transversely in the recess in response to small relative movements of the two components so as to allow relatively undamped movement therebetween within the confines of the relationship of the cavity and the elastic member.

Another feature of the invention is adapted to be embodied in a fluid damping arrangement that is comprised of an annular member having a groove formed in a peripheral surface thereof. At least one fluid passage extends through the annular member and intersects the groove. An elastic ring is received in the annular groove, and a sealing member is engaged with the peripheral surface for closing the groove and retaining the elastic ring therein.

DETAILED DESCRIPTION OF THE PREFERRED EMBODIMENTS

Figure 1:
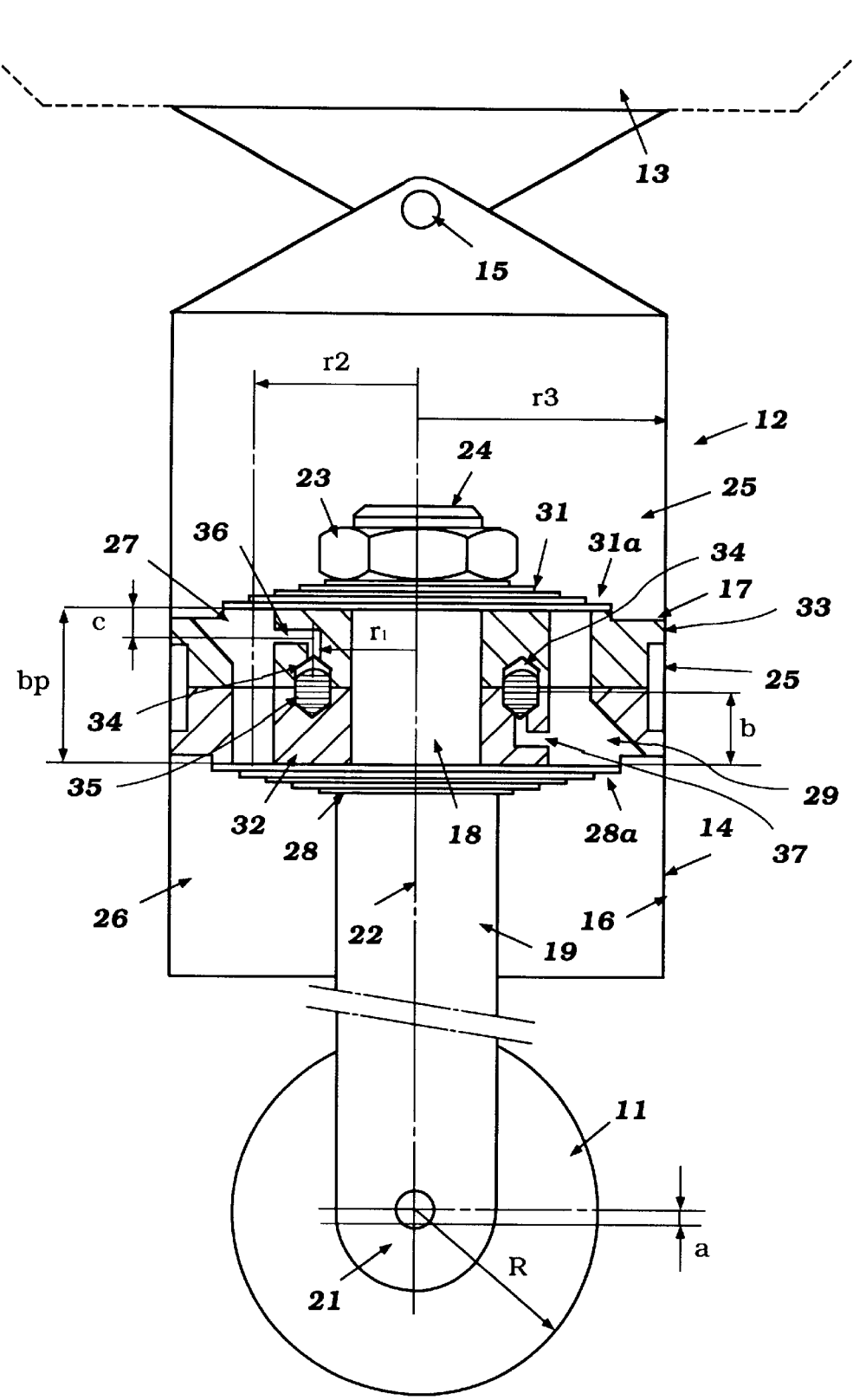
FIG. 1 is a partially schematic, cross-sectional view showing the suspension system for a single wheel of a vehicle having a shock absorber arrangement constructed in accordance with an embodiment of the invention.

Referring first to the embodiment of FIG. 1, a shock absorbing suspension system for a motor vehicle is illustrated and portions of the associated vehicle are illustrated only schematically. These vehicle portions include a suspended wheel 11 which is suspended by a suspension system including a shock absorber, indicated generally by the reference numeral 12, for suspension travel relative to a vehicle body or frame, shown partially and identified by the reference numeral 13.

The suspension system is comprised of the shock absorber 12 and an associated suspension spring, which is not illustrated and which may be of any known type. In addition, a linkage system by which the wheel 11 is supported for suspension travel relative to the frame 13 of any known type may be employed with these components. The invention deals primarily with the shock absorber 12 and, therefore, these other components which form no substantial part of the invention have not been illustrated and will not be described. Those skilled in the art will readily understand how the invention can be utilized with any known type of suspension system.

The shock absorber 12 includes a shock absorber cylindrical housing, indicated generally by the reference numeral 14, having a trunion portion that accommodates a pivotal connection 15 to the frame 13.

The cylinder housing 14 forms a cylinder bore 16 in which a piston element, indicated generally by the reference numeral 17 is supported for reciprocation. The piston element 17 is affixed to a reduced diameter portion 18 of a piston rod 19. The piston rod 19 extends through a seal at the lower end of the cylinder housing 14 and has a projecting end 21 that is connected to the wheel 11 in any suitable manner, as by a linkage system as aforenoted. The piston rod 19 has a central axis that is coaxial with the axis 22 of the cylinder bore 16.

The piston 17 is affixed to the cylindrical portion 18 of the piston rod 19 by means which will be described later but which include a fastening nut 23 that is received on a threaded end 24 of the piston rod 19.

A seal 20 is carried by the outer portion of the piston 17 in a manner which will be described and thus, the piston 17 divides the cylinder bore 16 into an upper fluid chamber 25 and a lower fluid chamber 26. A suitable hydraulic fluid is contained within these chambers 25 and 26. A damping arrangement is incorporated in the piston 17 so as to dampen the movement of the wheel 11 relative to the frame 13 by passing it through an orifice and damping arrangement now to be described.

This damping arrangement includes one or more first fluid passages 27 that extend from the chamber 25 to the chamber 26. These passages 27 have a tapered mouth facing the chamber 25 and a cylindrical end facing the chamber 26. A first stack of damping disks or shims, indicated generally by the reference numeral 28, are stacked between a shoulder formed on the piston rod 19 adjacent the reduced diameter portion 18 and the piston 17. As is well known in this art, these disks or shims 28 will open at a predetermined pressure to permit fluid to flow from the chamber 25 to the chamber 26 through the passage or passages 27.

Fluid flow from the chamber 26 to the chamber 25 is permitted through one or more fluid passages 29 that are formed in the piston 17. These passages 29 have large end portions that extend beyond the disk stack 28 and extend to the chamber 26. The other end of these passages 29 is smaller and is valved by a disk or shim stack 31. Like the disk stack 28, when sufficient pressure is exerted, the disk stack 31 will open and permit flow from the chamber 26 to the chamber 25.

There may be employed any desired number and size of the passages 27 and 29. These passages 27 and 29 extend generally axially through the piston 17, although they may also be helical in shape.

The structure of the shock absorber unit 12 as thus far described may be considered to be conventional. For that reason, further description of the conventional part of the shock absorber is not believed to be necessary to permit those skilled in the art to practice the invention.

It has been found that road holding can be significantly improved by permitting small amounts of movement of the wheel 11 relative to the frame 13 which are relatively undamped. These small movements are indicated by the dimension "a" in FIG. 1 which is relatively small even with respect to the radius R of the wheel 11. Next will be described a structure that permits these movements and which cooperates with the conventional damping arrangement of the shock absorber 12 so as to significantly improve road holding.

In accordance with a feature of the invention, the piston 17 in this embodiment is formed by two separate portions comprised of a lower portion 32 and an upper portion 33 which are held in abutting relationship with each other by the action of the threaded fastener or nut 23 and the shim stacks 28 and 31.

These portions 32 and 33 form an annular recess 34 at their interface which is, in this embodiment, disposed radially inwardly from the outer passages 27 and 29. That is, the cavity 34 is disposed at a radius r1 which is less than the radius r2 at which the openings 27 and 29 are formed. Both radii are smaller than the radius r3 of the cylinder bore 16. In this specific embodiment, the radius r1 is preferably in the range of ½–¾ of the radius r2.

An elastic or elastomeric ring, indicated generally by the reference numeral 35 is received in the recess 34 and is trapped therein by the abutting relationship between the piston portions 32 and 33. This also facilitates assembly of the unit and permits the ring 35 to be placed radially inwardly of the passages 27 and 29.

One side of the elastic ring 35 is exposed to the pressure in the chamber 25 through a first L-shaped passage 36 or series of such passages. This passage 36 communicates with the passage 27 adjacent its enlarged end and in the area where the passage is not restricted by the shim stack 31.

The lower side of the ring 35 is exposed to the pressure in the chamber 26 through a second L-shaped passage 37 or series of passages. Thus, when the pressure in one chamber is greater than the pressure in the other chamber, the ring 35 will move from one end of the groove 36 to the other end. The condition shown in FIG. 1 is the condition where the pressure in the chamber 25 is higher than the pressure in the chamber 26 which is the condition which occurs when the wheel 11 receives a slight jar tending to move it upwardly.

This initial upward movement is substantially unrestricted and the ring 35 will move downwardly from engagement with the opening 36 toward engagement with the opening 29. Hence, this small displacement of fluid will permit generally undamped motion of the wheel 11 relative to the frame 13. Still further movement may be slightly damped by the elastic compression of the ring 35.

In a specific arrangement, the movements of the wheel that are undamped in the range A range from 0.1–1 millimeter from the neutral position. It is possible, however, to vary this range such as in the ranges of 0.2–0.6 millimeters or preferably in the range of 0.4–0.5 millimeters.

As will be described later, it is preferable to have a distance, indicated by the distance b between the lower most shims 28*a* or 31*a* of the shim stacks 28 and 31, respectively and the center point of the elastic ring 35 when the elastic ring is in sealing engagement with the respective passage 36 or 37. As noted, the condition shown in FIG. 1 is the condition when the ring 35 is in sealing engagement with the passage or passages 37.

Preferably, the distance b should be less than ½ of the height bp of the piston 17 which is equivalent to the distance between the lowermost shims 28*a* and 31*a*. Also, the distance c between the openings of the passages 36 and 37 into their respective main passages 27 and 29 is preferably less than the height of the elastic ring 35.

Figure 2:
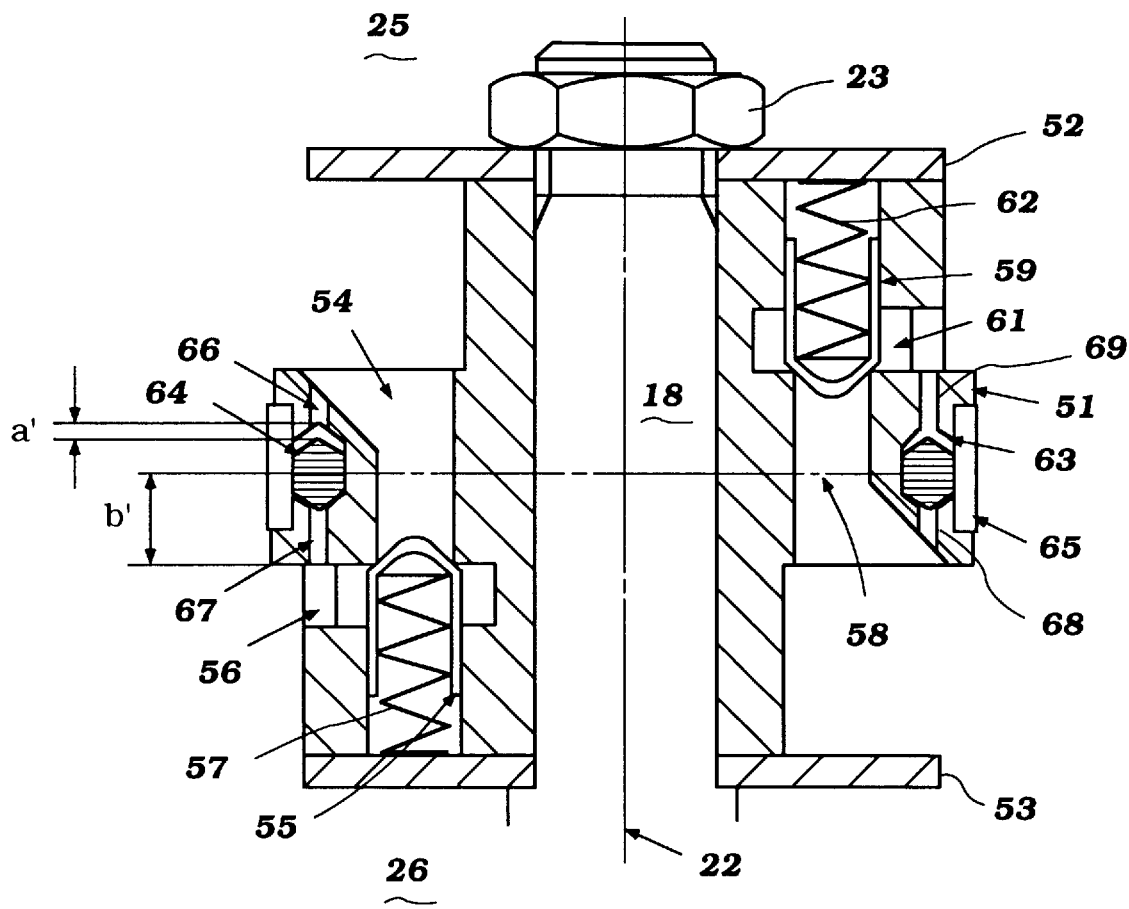
FIG. 2 is a partial cross-sectional view taken through a shock absorber constructed in accordance with a second embodiment of the invention.

FIG. 2 shows another embodiment of the invention which differs from the previous embodiment in several regards. However, the association of the piston, indicated by the reference numeral 51 in this embodiment, and the cylinder 14, which is not illustrated in this figure, is the same and thus, has not been illustrated for that very reason.

In this embodiment, the piston 51 has a cylindrical center section that is received on the piston rod portion 18 and held in place axially thereon by upper and lower retaining plates 52 and 53 respectively by the nut 23.

The piston 51 is formed with a first passage or series of passages 54 having open end portions that communicate directly with the chamber 25 and which terminate at their lower ends with counter bores in which sliding plunger valve elements 55 are provided. These valve elements 55 valve radially extending passageways 56 that communicate the chamber 25 with the lower chamber 26 when the shock absorber is functioning and the wheel 11 is moving upwardly relative to the frame 13. The end plate 53 serves as a base against which a return spring 57 of the valve element 55 acts.

In a like manner, a second passage or series of passages 58 extend from open end portions that communicate directly to the chamber 26. These passages are formed with counter bores at their lower ends that are valved by a plunger-type valve element 59. The valve elements 59 controls the communication of the passageway with the chamber 25 through radially extending passageways 61. A coil compression spring 62 retained by the end plate 52 determines the pressure at which the valve plunger 59 will open.

In this embodiment, an annular groove 63 is formed which extends around the center portion of the piston 51 and opens radially outwardly through the outer surface of the piston 51. Thus, it is not necessary to use the two-part piston and an elastic ring 64 may be placed in the groove 63 through the outer surface. This open area is then closed by a seal 65 which forms the combined function of sealing with a cylinder bore 16 and also holding the elastic member 64 within the groove 63.

A first passage or series of passages comprised of an upper portion 66 and a lower portion 67 communicate with the passages 54 and 56 respectively. A second passage or series of passages 68 and 69 communicate with the passages 58 and 61, respectively. In this embodiment, the passages 66, 67 and 68, 69 can be coaxial with the piston rod axis 22 so as to be easier to manufacture.

Thus, when the pressure in the chamber 25 is higher than the pressure in the chamber 26 during the small wheel movements a', the elastic ring 64 can move downwardly in the groove 63 away from the passages 66 and 69 and engage the passages 67 and 68 and thus, permit some slight undamped wheel movement, as previously noted.

When the pressure difference reverses, the ring 64 moves upwardly in the groove 63 away from the passages 66 and 67 and toward and closing the passage 66 and 69. Thus, undamped movement is permitted in both direction. Again elastic deformation of the ring 64 may also be employed for further slightly damped motion.

The distance b' between the center of the ring 64 and the ends of the passages 67 and 69, respectively, is preferably the same or slightly larger than the axial dimension of the ring 64 in the direction of the axis 22. With this arrangement, the distance a' represents the movement of the elastic ring 64 corresponding to the undamped wheel movement indicated at a in FIG. 1.

Figure 3:
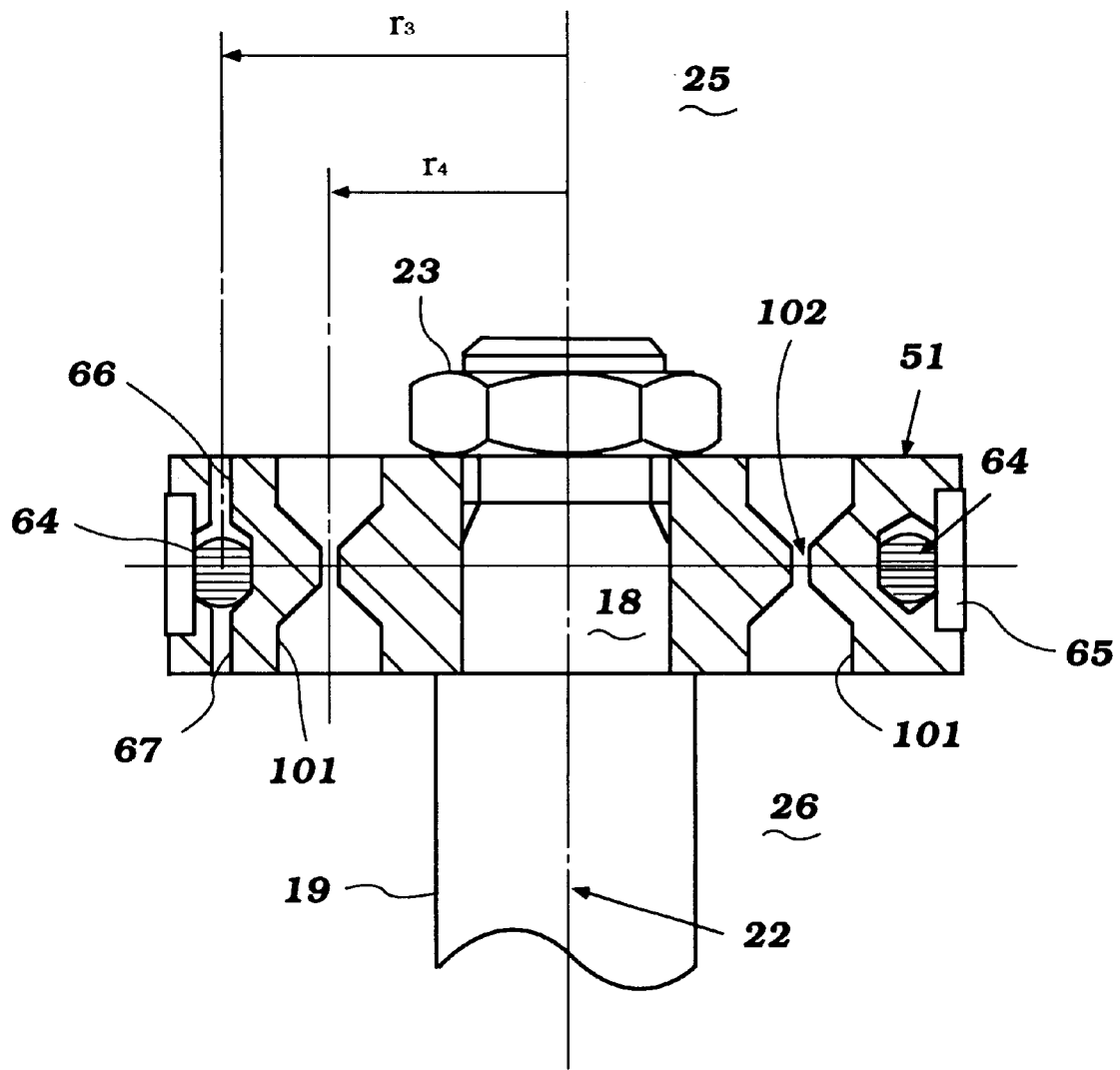
FIG. 3 is a partial cross-sectional view taken through a shock absorber constructed in accordance with a third embodiment of the invention.

FIG. 3 illustrates another embodiment which is generally the same as the embodiment of FIG. 2. However, in this embodiment, the pressure responsive valve elements 55 and 56 that control the flow through the damping passages 54 and 58 are eliminated. Thus, components of this embodiment which are the same as that of the embodiment of FIG. 2 and/or FIG. 1 have been identified by the same reference numerals and will not be described again except insofar as is necessary to understand the construction and operation of this embodiment.

In this embodiment, one or more passages 101 extend through the piston 51 between the chambers 25 and 26. In these passages, there are formed fixed diameter flow restrictions 102 that provide the damping for fluid flow between the chambers 25 and 26. Again, however, the elastic members 64 permit some degree of limited undamped motion without necessitating flow through the passages 101 as previously described. In this embodiment, the radius r3 for the flow passages in which the elastic member 64 is positioned is greater than the radius r4 where the passages 101 and flow restrictions 102 are formed. Preferably, the radius r4 is between ⅕ and ⅓ and preferably ¼ of the radius r3.

Figure 4:
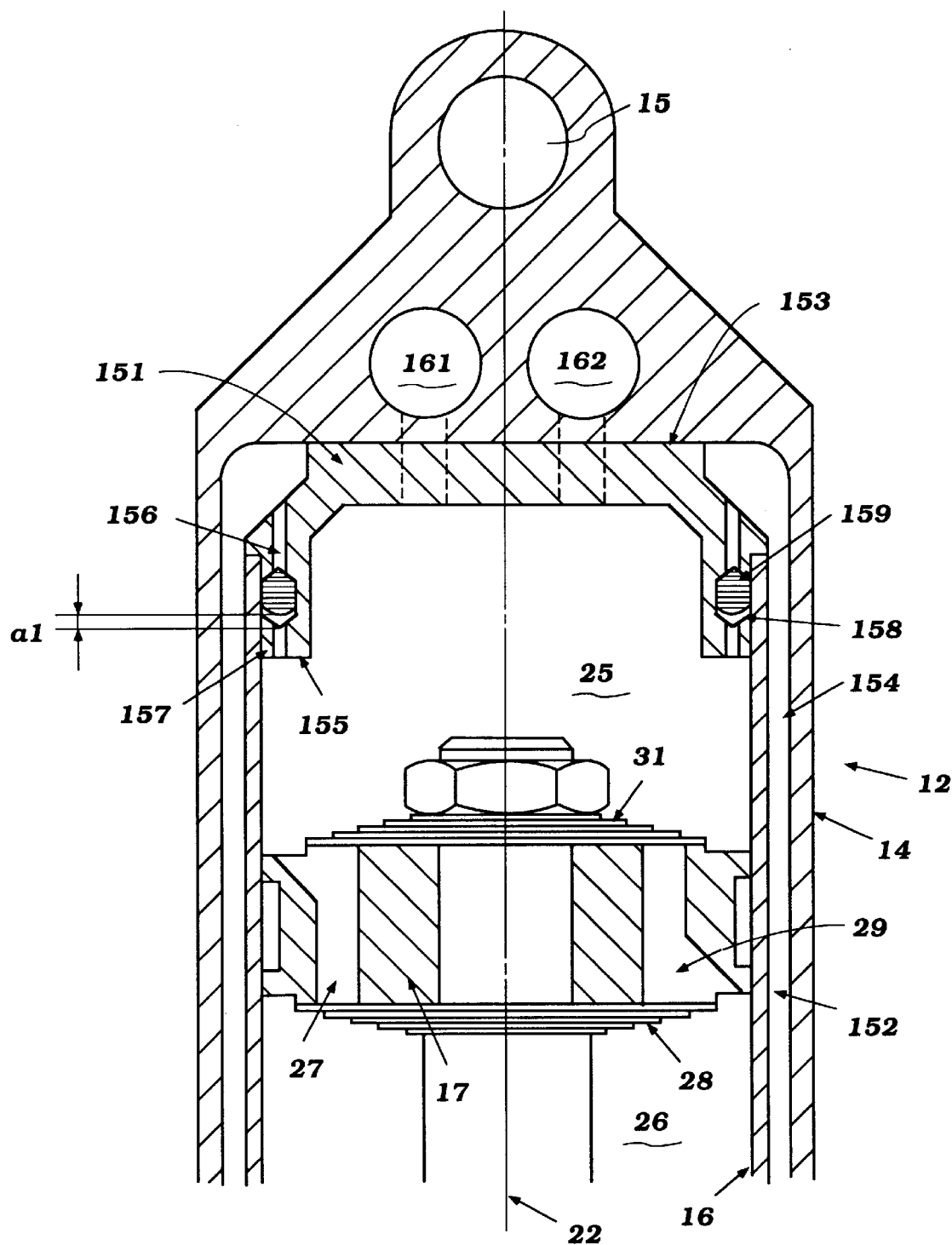
FIG. 4 is a partial cross-sectional view taken through a shock absorber constructed in accordance with a fourth embodiment of the invention.

In all of the embodiments as thus far described, the cavities and elastic members have been formed within the reciprocating piston along with the flow passages which communicate the opposite sides of the elastic member to the respective fluid chambers. FIG. 4 shows another embodiment wherein this construction is separated from the piston and is mounted in a gable-like member indicated generally by the reference numeral 151 which is fixed in the top of the cylinder housing 13.

The damping mechanism for the piston 17 is the same as that described in FIG. 1 and hence, the reference numerals applied to like components in this embodiment and that earlier embodiment are employed. Again, those components and their operation will not be described except insofar as is necessary to understand the construction and operation of this embodiment.

In this case, the cylinder bore 16 is formed by an inner sleeve 152 the upper end of which is closed by the gable member 151 and which has its end portion 153 in abutting relationship with the end of the cylinder housing 14. Hence, the area between the inner cylinder member 152 and the outer cylinder housing 14 forms a fluid chamber 154. This fluid chamber 154 is also at least partially filled with a hydraulic fluid.

The gable member 151 has a skirt portion 155 in which one or more passages 156 and 157, which extend parallel to the piston rod axis 22 are formed. These passages 156 and 157 intersect and pass through an annular gap or cavity 158 in which an elastic elastomeric ring 159 is positioned with a clearance. The clearance dimension is indicated at a1 in this figure and this represents the degree of free movement possible for the undamped movement of the wheel, as should be apparent from the foregoing description. The lower end of the fluid chamber 154 communicates directly with the chamber 26 through one or more passages.

The gable member 151 may also provide communication with a pair of passages 161 and 162 in which other types of known flow controlling valves can be positioned for further controlling the damping characteristics of the shock absorber and the overall suspension system.

With this embodiment, the inner cylinder 152 closes the outer periphery of the gap 158 and holds the elastic member 159 in position. Hence, in this embodiment, the outer cylinder 152 forms the same function as the seals 65 in the embodiments of FIGS. 2 and 3.

Figure 5:
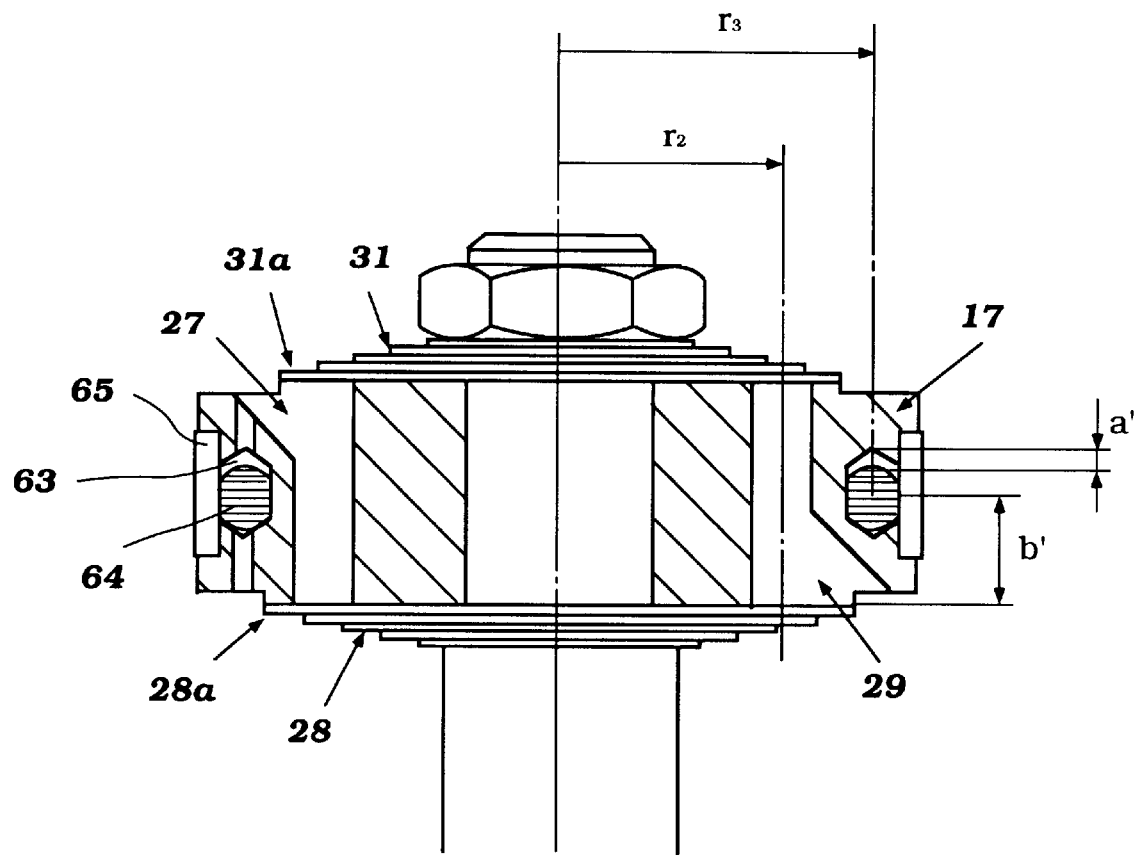
FIG. 5 is a partial cross-sectional view taken through a shock absorber constructed in accordance with a fifth embodiment of the invention.

FIG. 5 shows another embodiment which uses the shim stack damping arrangement of the type shown in FIG. 1. In this embodiment, however, the annular gap 63 and elastomeric ring 64 are positioned on the outer periphery of the flow passages 27 and 29 and is held in place by the seal 65 as in the construction shown in FIG. 2. Because of the similarity of this construction to those of FIGS. 1 and 2, components of this figure which are the same as components of either or both of those figures have been identified by the same reference numerals. Further description of their structure, is, therefore, believed to be unnecessary to permit those skilled in the art to practice the invention.

In this embodiment, the radius r3 on which the cavities or grooves 63 lie, is greater than the radius r2 on which the centers of the passages 27 and 29 lie. In a preferred embodiment, the radius r2 is equal to ½–⅓ of the radius r3. The greater the radius r3, compared with the corresponding dimension in FIG. 1, the less distinct the movement of the elastic ring 64 is.

Figure 6:
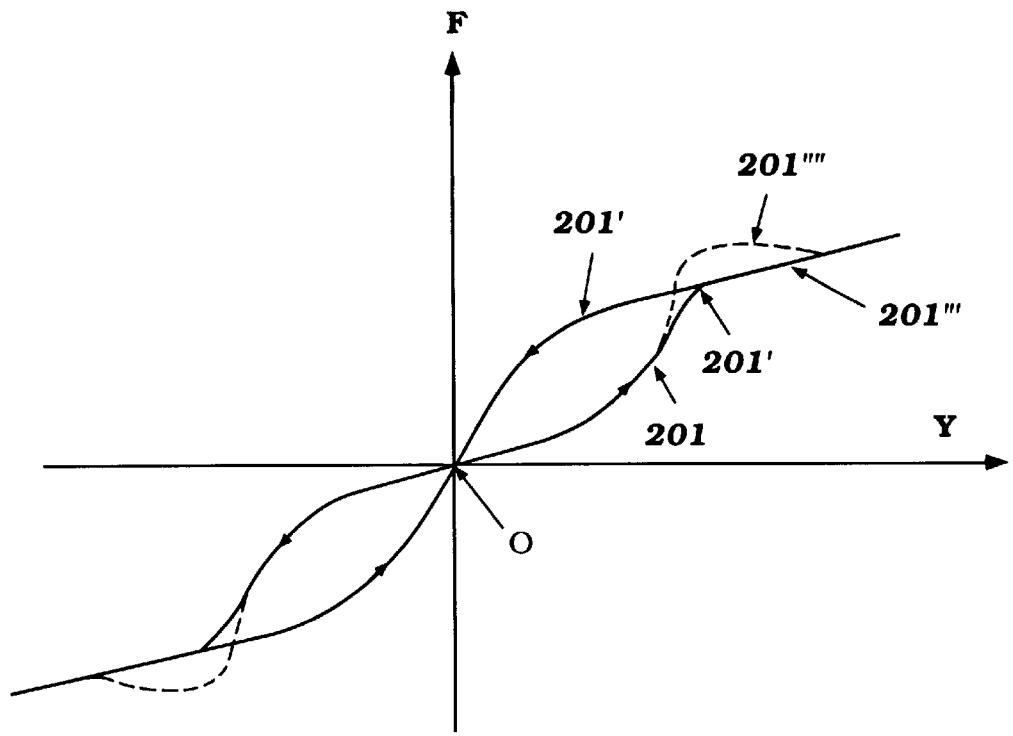
FIG. 6 is a graphical view showing the damping force and suspension element velocity characteristics in order to explain how the invention operates.
Figure 7:
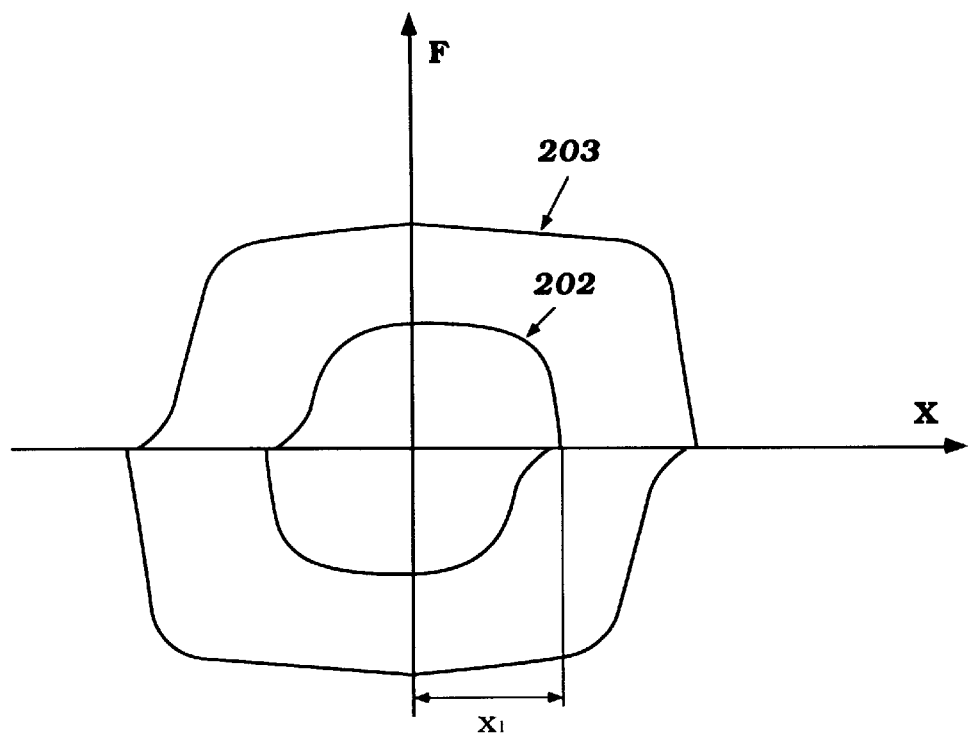
FIG. 7 is a graphical view showing the force and displacement characteristics of the shock absorbers constructed in accordance with the embodiments of the invention to explain their principal of operation.

The damping effects achieved by the elastic rings of the various embodiments in combination with the otherwise conventional shock absorber damping can be best understood by reference to FIGS. 6 and 7. These figures show how the variations in the configuration of the ring and its receiving gap can be utilized to tailor the suspension characteristics so as to permit some undamped wheel travel for improved road holding.

Referring first to FIG. 6, this is a force v velocity curve for the shock absorbers already described. Force is represented on the Y axis while velocity is represented on the S axis. This curve shows both positive and negative velocities and directions of travel.

The solid line curve 201 shows the damping characteristics both in the positive and negative directions with the return motion being shown by curve 201'. As may be seen, the damping curve is generally exponential. However, by utilizing the elastic rings, the effect at the point 201" tends to smoothed out the damping curve and provide a more gradual transition as shown by the line portion 201'''. Also, the possibility of overshooting as shown by the broken line portion 201"" is avoided with this arrangement Hence, the transition is much smoother and the amount of hysteresis on return is substantially reduced.

FIG. 7 is another damping curve showing through two different curves 202 and 203 the relationship of force and displacement The curve 202 is the result of small movements with the amount of movement indicated at x'. The larger movements are damped in accordance with the curve 203.

Thus, from the foregoing description it should be readily apparent that the shock absorber utilizing in combination the damping features of a conventional type shock absorber coupled with the advantages of the elastic ring relatively undamped operation are very effective in providing good road holding.

Of course, it should be understood that the foregoing description is that of preferred embodiments of the invention and that various changes and modifications may be made without departing from the spirit and scope of the invention, as defined by the appended claims.

We claim:

1. A hydraulic shock-absorbing and fluid damping arrangement for damping the relative movement of two components comprised of a device defining two fluid chambers between which controlled flow through a damping passage is permitted for damping of the relative movement between said components, an enclosed damping cavity formed solely by one of said components communicating with said two fluid chambers through respective passages formed in said one component, an elastic member contained in said damping cavity for precluding direct flow therethrough from one fluid chamber to the other, said elastic member being slidable in said cavity for accommodating limited displacement of fluid from at least one of said fluid chambers into said damping cavity in an undamped fashion.

2. A hydraulic shock-absorbing system of claim 1, wherein the means for providing the controlled flow between the fluid chambers through the damping passage comprises a pressure responsive valve.

3. The hydraulic shock-absorbing system of claim 1, wherein the pressure-responsive valve comprises a stacked shim-type valve.

4. The hydraulic shock-absorbing system of claim 1, wherein there are a pair of damping passages extending between the two chambers, each of which is controlled by a respective pressure-responsive valve, one of which permits flow from one fluid chamber to the other, and the other of which permits flow from the other fluid chamber to the one fluid chamber.

5. The hydraulic shock-absorbing system of claim 4, wherein each of the pressure-responsive valve comprises a stacked shim-type valve.

6. The hydraulic shock-absorbing system of claim 2, wherein the controlled flow between the fluid chambers is provided by an orifice in the damping passage.

7. The hydraulic shock-absorbing system of claim 2, wherein the damping cavity comprises a annular recess formed in the one component and the elastic member is comprised of an elastic ring.

8. The hydraulic shock-absorbing system of claim 7, wherein the two fluid chambers are formed by a cylinder having a cylinder bore and a piston reciprocating in said cylinder bore.

9. The hydraulic shock-absorbing system of claim 8, wherein the one component comprises the piston and the annular recess is formed within said piston and elastic ring is contained within said piston.

10. The hydraulic shock-absorbing system of claim 9, wherein the means for providing the controlled flow between the chambers comprises a pressure-responsive valve carried by the piston.

11. The hydraulic shock-absorbing system of claim 10, wherein there are a pair of damping passages extending between the two chambers, each of which is controlled by a respective pressure-responsive valve, one of which permits flow from one fluid chamber to the other, and the other of which permits flow from the other fluid chamber to the one fluid chamber.

12. The hydraulic shock-absorbing system of claim 11, wherein the damping passages are disposed radially outwardly of the annular recess.

13. The hydraulic shock-absorbing system of claim 12, wherein the piston is formed from two pieces split along a radial plane and having radial surfaces abutting each other at the radial plane and the recess is formed in at least one of the piston piece surfaces.

14. The hydraulic shock-absorbing system of claim 13, wherein the recess is formed in each of the piston pieces.

15. The hydraulic shock-absorbing system of claim 14, wherein the pressure-responsive valves comprise stacked shim-type valves.

16. The hydraulic shock-absorbing system of claim 11, wherein the pressure-responsive valves comprise piston type valves.

17. The hydraulic shock-absorbing system of claim 11, wherein the passages are disposed radially inwardly of the annular recess.

18. The hydraulic shock-absorbing system of claim 17, wherein the annular recess is formed in the outer periphery of the piston.

19. The hydraulic shock-absorbing system of claim 18, wherein the elastic ring is held in the recess by a cylindrical member of the one component having an axial length at least equal to the axial length of the recess.

20. The hydraulic shock-absorbing system of claim 19, wherein the cylindrical member is a seal carried by and forming a part of the piston and engaging the cylinder bore of the cylinder.

21. The hydraulic shock-absorbing system of claim 9, wherein the controlled flow between the chambers is provided by an orifice in the damping passage and the damping passage is formed in the piston.

22. The hydraulic shock-absorbing system of claim 21, wherein the damping passage is disposed radially inwardly of the annular recess.

23. The hydraulic shock-absorbing system of claim 22, wherein the annular recess is formed in the outer periphery of the piston.

24. The hydraulic shock-absorbing system of claim 23, wherein the elastic ring is held in the recess by a cylindrical member of the one component having an axial length at least equal to the axial length of the recess.

25. The hydraulic shock-absorbing system of claim 24, wherein the cylindrical member is a seal carried by the piston and engaging the cylinder bore of the cylinder.

26. The hydraulic shock-absorbing system of claim 8, wherein the recess and the elastic ring are held in a fixed position in the cylinder.

27. A hydraulic shock-absorbing and fluid damping arrangement for damping the relative movement of two components comprised of a piston defining at least in part two fluid chambers on opposed sides thereof, a annular damping recess formed in said piston communicating at opposite sides thereof with said two chambers through respective passages, an elastic ring positioned in said recess for precluding direct flow therethrough from one chamber to the other, said elastic ring being slidable in said recess for accommodating limited displacement of fluid from at least one of said chambers into said recess in an undamped fashion.

28. The hydraulic shock-absorbing arrangement of claim 27, wherein the annular recess is formed radially inwardly of the outer periphery of the piston and said piston is formed from two pieces split along a radial plane and having radial surfaces abutting each other at the radial plane and said annular recess is formed in at least one of the piston piece surfaces.

29. The hydraulic shock-absorbing system of claim 28, wherein the recess is formed in each of the piston pieces.

30. The hydraulic shock-absorbing arrangement of claim 27, wherein the annular recess is formed in the outer periphery of the piston and the elastic ring is held in the recess by a cylindrical member having an axial length at least equal to the axial length of the recess.

31. The hydraulic shock-absorbing system of claim 30, wherein the cylindrical member is a seal carried by the piston and engaging the cylinder bore of a cylinder.

* * * * *